United States Patent
Zhang et al.

(10) Patent No.: US 9,694,356 B2
(45) Date of Patent: Jul. 4, 2017

(54) METHOD FOR REGENERATING SEMI-REGENERATED REFORMING CATALYST

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Daqing Zhang, Beijing (CN); Gaoshan Zang, Beijing (CN); Yuhong Zhang, Beijing (CN); Jiaxin Wang, Beijing (CN); Tao Wang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 29 days.

(21) Appl. No.: 15/081,234

(22) Filed: Mar. 25, 2016

(65) Prior Publication Data
US 2016/0279626 A1 Sep. 29, 2016

(30) Foreign Application Priority Data

Mar. 25, 2015 (CN) .......................... 2015 1 0133403
Mar. 25, 2015 (CN) .......................... 2015 1 0133674
Mar. 25, 2015 (CN) .......................... 2015 1 0134342

(51) Int. Cl.
| | |
|---|---|
| B01J 20/34 | (2006.01) |
| B01J 38/44 | (2006.01) |
| B01J 27/32 | (2006.01) |
| B01J 38/10 | (2006.01) |
| B01J 38/60 | (2006.01) |
| B01J 38/04 | (2006.01) |
| B01J 38/14 | (2006.01) |
| B01J 38/18 | (2006.01) |
| B01J 38/62 | (2006.01) |
| B01J 27/13 | (2006.01) |
| C10G 35/09 | (2006.01) |
| C10G 35/06 | (2006.01) |
| B01J 37/20 | (2006.01) |

(52) U.S. Cl.
CPC .............. *B01J 38/44* (2013.01); *B01J 27/13* (2013.01); *B01J 27/32* (2013.01); *B01J 38/04* (2013.01); *B01J 38/10* (2013.01); *B01J 38/14* (2013.01); *B01J 38/18* (2013.01); *B01J 38/60* (2013.01); *B01J 38/62* (2013.01); *C10G 35/06* (2013.01); *C10G 35/09* (2013.01); *B01J 37/20* (2013.01)

(58) Field of Classification Search
CPC .......... B01J 20/34; B01J 23/94; C01B 31/088
USPC .......................................................... 502/56
See application file for complete search history.

(56) References Cited

U.S. PATENT DOCUMENTS

| | | | | |
|---|---|---|---|---|
| 5,508,243 | A * | 4/1996 | Mitzkat ...................... | B01J 8/16 |
| | | | | 219/388 |
| 7,781,361 | B2 * | 8/2010 | Gadkaree ............... | B01D 53/64 |
| | | | | 502/34 |
| 2005/0159296 | A1* | 7/2005 | Ginestra .................. | B01J 23/94 |
| | | | | 502/30 |
| 2012/0270724 | A1 | 10/2012 | Lew | |

FOREIGN PATENT DOCUMENTS

CN            1246517 A       3/2000

* cited by examiner

*Primary Examiner* — Edward Johnson
(74) *Attorney, Agent, or Firm* — Novick, Kim & Lee, PLLC; Allen Xue

(57) ABSTRACT

This disclosure describes a method for regenerating a semi-regenerated reforming catalyst. The method comprises adjusting the reaction temperature to 250-480° C., introducing a sulfur-containing naphtha into the reforming reactor, or stopping introducing a feedstock into the reforming reactor, and introducing a sulfur-containing hydrogen into a recycle gas, until the sulfur content in the catalyst is 0.32-0.8 mass %, then the catalyst is subject to coke-burning, oxychlorination and reduction. Alternatively, the method first subjects the spent catalyst to coke-burning followed by introducing sulfate ions thereinto; and then performing oxychlorination and reduction. Disclosed is still another method for regenerating a platinum-rhenium reforming catalyst, which comprises coke-burning the spent catalyst; introducing sulfur and chlorine in the catalyst by impregnation; and then drying, calcinating and reducing.

40 Claims, No Drawings

METHOD FOR REGENERATING SEMI-REGENERATED REFORMING CATALYST

TECHNICAL FIELD

The present invention relates to a method for regenerating naphtha reforming catalyst, specifically a method for regenerating semi-regenerated naphtha reforming catalyst.

BACKGROUND TECHNOLOGY

Catalytic reforming is a process with $C_6$-$C_{12}$ naphtha fractions as feedstocks for producing high-octane gasoline blending component or aromatics and by-product hydrogen by subjecting the feedstock hydrocarbon molecules to reforming reactions such as dehydrogenation of cycloalkane, dehydroisomerization of straight chain alkane and dehydrocyclization of paraffins, etc. in the presence of hydrogen and catalysts at a certain temperature and a pressure. A supported bifunctional reforming catalyst widely adopted in current catalytic reforming technology comprises the hydrogenation/dehydrogenation function provided by a metal component and the acidic isomerization function provided by a support. The reforming catalyst is typically a bi (or multi) metallic catalyst using active alumina as the support and Pt as the major metal component, and comprising a second metal component such as rhenium, tin or germanium.

As for the bifunctional reforming catalyst, the metallic function and the acidic function act synergistically on the catalytic reforming reaction. If the hydrogenation/dehydrogenation active function of the metal in the two is too strong, carbon deposit on surfaces of the reforming catalyst will increase rapidly, which goes against the proceeding of the reforming reaction; and if the function of the metal is too weak, the activity of hydrogenation/dehydrogenation reaction will decrease. If the acidity is too strong, the hydrocracking activity of the catalyst is comparatively strong, and the liquid yield of the reforming product will decrease; and if the acidity is too weak, the activity will decrease. Therefore, the balanced match between the acidic function and metallic function of the support determines the activity, selectivity and stability of the catalyst.

In addition, as for a platinum-rhenium reforming catalyst used for semi-regenerated catalytic reforming, since the metal rhenium has a quite high hydrogenolysis activity, if the activity of rhenium is not passivated at the beginning of operation, a drastic hydrogenolysis reaction will occur in the initial state of feed supply, which releases a great amount of reaction heat to make the temperature of the catalyst bed rise rapidly and cause an overtemperature phenomenon. Once such a phenomenon occurs, serious consequences tend to be caused. Minor consequences include a large amount of carbon deposit of the catalyst, which decreases the activity and stability of the catalyst; and serious consequences include burning out the catalyst, reactor and internal components. Hence, the platinum-rhenium reforming catalyst needs to be presulfurized before feedstock injection. The excessive hydrogenolysis reaction of a fresh catalyst is reduced through presulfurization so as to protect the activity and stability of the catalyst and improve the selectivity of the catalyst. Methods for presulfurization of the platinum-rhenium catalyst include two types, one of which introduces $H_2S$ into hydrogen and carries out presulfurization of the catalyst slowly under certain temperature and pressure, and the other of which injects organic sulfides such as dimethyl disulfide and dimethyl sulfide and so on into hydrogen under certain temperature and pressure and uses $H_2S$ formed after decomposition of these organic sulfides for presulfurization of the catalyst. The first method is usually used in laboratory investigation. The second method is widely used for a start-up of industrial devices of the platinum-rhenium catalyst. These two methods both have the nature of presulfurizing the catalyst with $H_2S$ and both pertain to gas-phase sulfurization. The presulfurization of the platinum-rhenium reforming catalyst has problems of equipment corrosion, environmental pollution and security risks and the like.

The existing technologies for regenerating reforming catalyst, as disclosed in USP20120270724, include catalyst coke-burning, oxychlorination and reduction.

The sulfur content in the feed needs to be strictly limited during the process of using the reforming catalyst and is usually required to be less than 1 ppm. If sulfur poisoning occurs during the process of using the catalyst, and the sulfur absorbed on the catalyst is oxided to form sulfate ion, it is generally considered that the performance of the catalyst will be hurt. Therefore, sulfur on the catalyst needs to be removed before the catalyst coke-burning. It is usually removed by means of the recycle hydrogen used at a higher temperature after the feed to the reformer is stopped, so as to avoid the production of sulfate ion during the coke-burning process. Or after sulfate ions in a certain content are produced, the sulfate ions need to be removed.

CN98117895.2 discloses a method of removing sulfate ions from the reforming catalyst, comprising introducing at 400° C. to 600° C. organic chlorine compounds, which are decomposed into hydrogen chloride under said condition, into the catalyst poisoned with sulfate ions so as to remove them. This method can effectively remove the sulfate ions in the catalyst compared with the conventional regeneration of the catalyst by oxychlorination.

SUMMARY OF THE INVENTION

The objective of the present invention is to provide a method for regenerating semi-regenerated reforming catalyst. Said regeneration method comprises introducing sulfur in a relatively high content into the spent catalyst before or after coke-burning. This method has good regeneration effect and requires no presulfurization after reduction.

The first regeneration method provided in the present invention comprises comprising adjusting the reaction temperature to 250-480° C.; introducing a sulfur-containing naphtha into a reforming reactor so that the sulfur content in the catalyst is 0.32-0.8 mass %; then stopping introducing the feedstock into the reforming reactor; or stopping introducing the feedstock into the reforming reactor, and introducing a sulfur-containing hydrogen into a recycle gas, so that the sulfur content in the catalyst is 0.32-0.8 mass %, then stopping the recycle gas; subjecting the catalyst to coke-burning, oxychlorination and reduction.

The second method for regenerating semi-regenerated reforming catalyst provided in the present invention comprises introducing sulfate ions into the spent catalyst after coke-burning; then performing oxychlorination and reduction.

The third method for regenerating semi-regenerated reforming catalyst provided in the present invention comprises coke-burning the spent catalyst; introducing sulfate ions and chlorine by impregnation; then drying, calcinating and reducing.

The method according to the present invention regenerates the catalyst by introducing sulfur into the catalyst by use of sulfur-containing naphtha or sulfur-containing hydrogen before coke-burning or introducing sulfate ions into the catalyst by impregnation after coke-burning. The method of the present invention introduces a relatively large amount of sulfur into the catalyst, which can effectively recover the performance of the catalyst and simplify the regeneration operation of the semi-regenerated reforming catalyst, so that the catalyst needs no presulfurization after reduction.

SPECIFIC EMBODIMENTS

The method for regenerating semi-regenerated reforming catalyst provided in the present invention is to introduce sulfur in a relatively high content into spent catalyst with decreased activity before the reduction. There are two ways for introducing sulfur: one is to introduce sulfur into the reactor, i.e., not unloading the catalyst from the reactor after deactivation, but introducing sulfur-containing naphtha into the reactor; introduce sulfur contained in the oil into the catalyst, then stop feeding naphtha and subject the catalyst to coke-burning, oxychlorination and reduction, namely, the first regeneration method of the present invention, in which one can also stop feeding naphtha, introduce sulfur-containing hydrogen into the recycle gas, introduce sulfur into the catalyst, then stop recycle gas, and subject the catalyst to coke-burning, oxychlorination and reduction. The other way for introducing sulfur is to introduce sulfate ions into it by means of impregnation after the spend catalyst coke-burns off, wherein said sulfate ion can either be introduced singly or together with chlorine element, i.e., the second and third methods of the present invention.

The first regeneration method according to the present invention treats the catalyst by use of the sulfur in the naphtha or sulfur-containing hydrogen, which makes the catalyst adsorb a certain amount of sulfur and simplifies the regeneration start-up process.

The second regeneration method according to the present invention is to introduce a proper amount of sulfur into the carbon-free catalyst, and then subject the catalyst to oxychlorination and reduction. The third regeneration method is to introduce a certain amount of sulfate ion and chlorine element by impregnation into the semi-regenerated reforming catalyst after coke-burning off, then dry, calcinate and then reduce.

None of the catalysts regenerated by said three methods of the present invention needs presulfurization. They also have good reaction performance. Regenerating the semi-regenerated reforming catalyst using the methods of the present invention does not need to set sulfur injection tanks or pipelines within the reformer.

The first method for regenerating semi-regenerated reforming catalyst provided in the present invention is to reduce temperature before coke-burning the catalyst decreased in activity or deactivated (spent catalyst), introduce sulfur-containing naphtha into the reactor to treat the catalyst, then stop feeding and regenerate the catalyst, wherein said regeneration step comprises coke-burning, oxychlorination and reduction; or introducing sulfur-containing hydrogen into the recycle gas to treat the catalyst after stopping feeding and then stopping recycle gas, subjecting the catalyst to coke-burning, oxychlorination and reduction.

The present invention treats the catalyst with sulfur-containing naphtha before the coke-burning, wherein the content sulfur in the catalyst is preferably 0.32-0.8 mass %, more preferably 0.32-0.6 mass %.

Said sulfur-containing naphtha introduced into the reactor may be sulfur-containing crude naphtha or refined naphtha comprising sulfur-containing compounds.

Said sulfur-containing crude naphtha may be obtained by not hydrotreating the crude oil, or reducing the hydrotreation severity of the crude oil. If the sulfur amount contained in the crude naphtha is not enough, a sulfur-containing compound may also be added thereto.

Said refined naphtha comprising sulfur-containing compounds is obtained by injecting sulfur-containing compounds into the refined naphtha.

The sulfur content in the sulfur-containing naphtha introduced into the reactor is 100-10000 ppm, preferably 200-2000 ppm, and more preferably 200-1000 ppm.

Here, the sulfur-containing compounds added to the naphtha are preferably selected from hydrogen sulfide, thioether, disulphide, thioaldehyde, thiophene and their derivatives.

The sulfur-containing naphtha is introduced into the reactor at a weight hourly space velocity of 0.1-10.0 $h^{-1}$, preferably 1.0-3.0 $h^{-1}$ for a time of 1-100 hours, preferably 2-24 hours.

The sulfur content in the sulfur-containing hydrogen introduced into the recycle gas is 10-1000 μg/L, preferably 100-1000 μg/L.

In the first regeneration method according to the present invention, before treating the catalyst with the sulfur-containing naphtha or introducing the sulfur-containing hydrogen, the reaction temperature needs to be adjusted to 250-480° C., wherein the reaction temperature is preferably reduced to 300-450° C., more preferably 300-400° C.

After treating the spent catalyst with sulfur-containing naphtha, the feeding is stopped, and the regeneration is performed according to conventional means, i.e., coke-burning, oxychlorination and reduction.

During the above regeneration process, the coke-burning temperature is 400-550° C., preferably 450-500° C. The coke-burning is carried out using oxygen-containing nitrogen or air. When coke-burning with oxygen-containing nitrogen, the oxygen content therein is 0.5-21 vol. %, preferably 1-5 vol. %.

During said oxychlorination process, the oxygen content in the oxygen-containing nitrogen is preferably 13.0-21.0 vol. %; chorine-containing compound is injected thereinto, wherein the chlorine injection quantity is 0.1-1.5% of the mass of the catalyst, preferably 0.2-0.8%, i.e. 1.0-1.5 times of the chlorine injection quantity of a conventional oxychlorination; the oxychlorination temperature is 400-550° C., preferably 450-520° C.; said chorine-containing compound is selected from dichloroethane, trichloroethane, carbon tetrachloride or tetrachloroethylene.

After oxychlorination, the reduction is performed by use of hydrogen, wherein the reduction temperature is preferably 460-500° C. During the reduction process, it is preferable to introduce hydrogen at low temperature, and then raise the temperature to reduce the catalyst. It is better that the temperature of the hydrogen introduced to the catalyst is not higher than 250° C., preferably 30-200° C., and then the temperature is gradually increased to 420-520° C. to reduce the catalyst.

According to the second method of the present invention, during the regeneration process of semi-regenerated catalyst, a certain amount of sulfur is introduced into the catalyst by impregnation after coke-burning, wherein the introduction amount of sulfur can be precisely controlled; and then oxychlorination and reduction are conducted; during the reduction process, the sulfur adsorbed to the catalyst is presulfurized by means of "self-sulfuration", i.e., presulfurizing while reducing; and the regenerated catalyst needs no presulfurization before use.

The second regeneration method of the present invention is to proceed firstly by coke-burning the spent catalyst, wherein the coke-burning temperature is 400-550° C., preferably 450-500° C., the coke-burning uses oxygen-containing nitrogen, where the oxygen content is 0.5-21 vol. %, preferably 1.0-5.0 vol. %.

Sulfate ions are introduced into the coke-burned off catalyst by impregnation so as to precisely control the introduction amount of sulfate ion. Sulfate ion is introduced by impregnation in such an amount that the spent catalyst comprises 0.32-0.8 mass % of sulfur and preferably comprises 0.32-0.6 mass % of sulfur.

In the second method of the present invention, the sulfate ion in the impregnation solution formulated by introducing sulfate ion by impregnation is provided from sulfuric acid, ammonium sulfate or aluminum sulfate; the impregnation solution formulated by introducing sulfate ion by impregnation is 0.5-2.0 times of the volume of the catalyst, preferably 0.8-1.3 times; the proper temperature for introducing sulfate ion by impregnation is 50-99° C., preferably 70-90° C.; and the proper impregnation time is 1-24 hours, preferably 2-8 hours.

In the second method of the present invention, vacuum-rotary impregnation is preferably used for introducing sulfate ion by impregnation. Said method fills the coke-burned off reforming catalyst into a rotatable impregnation tank, vacuumizes until the pressure is 0.001-0.08 MPa (absolute pressure), adds the formulated impregnation solution to the impregnation tank, raises the temperature to the impregnation temperature, wherein it is better to make the impregnation tank rotate at a velocity of 1-30 rpm, preferably 3-10 rpm, performs vacuum-rotary impregnation, so that the sulfate ions are distributed in the catalyst more evenly.

The catalyst into which the sulfate ions are introduced by impregnation is dried and calcinated in air and then subject to oxychlorination and reduction, wherein said drying temperature is 70-200° C., preferably 100-150° C.; the drying time is 1-12 hours; and the temperature of calcination after the drying is preferably 400-600° C.; the calcination time is preferably 1-8 hours.

Said oxychlorination and reduction in the second regeneration method of the present invention are both identical to the oxychlorination and reduction in the first regeneration method.

The third method for regenerating a platinum-rhenium semi-regenerated reforming catalyst in the present invention comprises introducing sulfate ions and chlorine into semi-regenerated catalyst after coke-burning, wherein the amounts of sulfate ions and chlorine introduced into the catalyst can be precisely controlled via the amounts of the sulfur-containing compound and chlorine-containing compound put into the impregnation solution; drying; calcinating, wherein the oxychlorination is completed during the calcination process; and then reducing. Sulfur adsorbed to the catalyst is presulfurized by means of "self-sulfuration" during the reduction process, i.e., presulfurizing while reducing. The catalyst regenerated by said regeneration method of the present invention needs no presulfurization before coming into operation.

The third method of the present invention is to proceed firstly by coke-burning the spent catalyst, wherein the coke-burning temperature is 400-550° C., preferably 450-500° C. The coke-burning uses oxygen-containing nitrogen, wherein the oxygen content is 0.5-21 vol. %, preferably 1.0-5.0 vol. %. Sulfate ions and chlorine are introduced into the coke-burned off catalyst by impregnation, wherein the sulfur amount contained in the impregnation solution that introduces sulfate ions and chlorine by impregnation is 0.32-0.8% of the mass of the catalyst, preferably 0.32-0.6%, and the amount of chlorine contained is 0.1-2.0% of the mass of the catalyst, preferably 0.2-1.0%.

In the third method of the present invention, the impregnation solution formulated by introducing sulfate ion and chlorine by impregnation is 0.5-2.0 times of the volume of the catalyst, preferably 0.8-1.3 times. The sulfur in the impregnation solution formulated by introducing sulfate ion and chlorine by impregnation is preferably from sulfuric acid or sulfate. The chlorine is preferably from hydrochloric acid and/or chloroacetic acid. Said sulfate is preferably ammonium sulfate or aluminum sulfate. Said chloroacetic acid is selected from trichloroacetic acid or dichloroacetic acid.

The proper temperature for introducing sulfate ion and chlorine by impregnation is 20-99° C., preferably 70-90° C. The proper impregnation time is 1-24 hours, preferably 2-8 hours.

In the third method of the present invention, a vacuum-rotary impregnation is preferably used for introducing sulfate ion and chlorine by impregnation. Said third method fills the coke-burned off reforming catalyst into a rotatable impregnation tank, vacuumizes until the pressure is 0.001-0.08 MPa (absolute pressure), preferably 0.002-0.03 MPa, adds the formulated impregnation solution to the impregnation tank, raises the temperature to the impregnation temperature, wherein it is better to make the impregnation tank rotate at a velocity of 1-30 rpm, preferably 3-10 rpm, and performs vacuum-rotary impregnation, so that the sulfate ions and chlorine are distributed in the catalyst more evenly.

The catalyst into which the sulfate ions and chlorine are introduced by impregnation needs to be dried and calcinated in air. During the calcination process, chlorine in the catalyst reacts with air to perform the oxychlorination. Said drying temperature is 70-200° C., preferably 100-150° C. The drying time is 1-12 hours. The temperature of calcination after the drying is preferably 400-600° C. The calcination time is preferably 1-8 hours.

The above catalyst into which the sulfate ions and chlorine are introduced by impregnation is reduced with hydrogen after drying and calcination. The reduction method is identical to that in the first regeneration method.

The semi-regenerated reforming catalyst as disclosed in each method of the present invention comprises alumina support and active components having the following contents based on the alumina support:
platinum 0.1-2.0 mass %;
rhenium 0.1-2.0 mass %;
chlorine 0.5-5.0 mass %.

Said reforming catalyst may also comprise 0.1-10 mass % of yttrium or rare earth metal, said rare earth metal being lanthanide metal, preferably ytterbium, europium or cerium.

Said catalyst is prepared by the following method: formulating the platinum-containing compound and rhenium-containing compound into an impregnation solution, which comprises chlorine; impregnating the alumina support with the impregnation solution; drying and calcinating the support that is impregnated to obtain the catalyst, wherein said platinum-containing compound is preferably chloroplatinic acid, the rhenium-containing compound is preferably perrhenic acid, said drying temperature is 100-120° C., the calcination temperature is 350-650° C. If the catalyst comprises yttrium or rare earth metal, the nitrate or chloride of yttrium or rare earth metal shall be added to the impregnation solution.

The present invention is elaborated by, but not limited to, the following examples.

The first method for regenerating semi-regenerated reforming catalyst of the present invention:

Comparative Example 1

(1) Performing the Catalytic Reforming Reaction

Taking 50 g PRT-D catalyst (produced from Changling Branch of SINOPEC Catalyst Co., Ltd) in a reduced state having a constitution as shown in Table 1; charging it into a 100 ml stainless steel pipe reactor; introducing nitrogen for replacement until the oxygen content in the system was less than 0.2 vol. %; then introducing high-purity hydrogen for replacement until the hydrogen concentration reached more than 95 vol. %, and the pressure reached 1.0 MPa; starting the compressor to perform gas cycle, wherein the circulation volume was 150 L/h; heating to 400° C.; slowly injecting 0.12 g dimethyl disulfide (DMDS) into the recycle gas to perform presulfurization to obtain the regeneration catalyst, the sulfur content of which is 0.10% by mass; introducing refined naphtha having a constitution as shown in Table 2 in a feeding volume of 110 g/h (WHSV 2.2 h$^{-1}$); heating to 500° C. to react for 200 hours.

(2) Performing Catalyst Regeneration

Cooling the reactor undergoing 200-hour reaction to 400° C.; stopping feeding; blowing with nitrogen until the total amount of H$_2$ and hydrocarbon in the recycle gas was less than 0.3 vol %; heating to 500° C.; supplementing air from the inlet of the compressor; controlling the oxygen content in the recycle gas to 0.8 vol. % and the gas circulation volume to 100 L/h; coke-burning for 20 hours, wherein the oxygen contents at the outlet/inlet of the reactor being identical showed that the coke-burning was complete; continuing to supplement air, so that the oxygen content in the recycle gas reached 10.5 vol. %; maintaining the gas cycle; injecting 0.45 ml dichloroethane in five batches within 4 hours to carry out the oxychlorination; supplementing high-purity nitrogen until the oxygen content in the recycle gas was less than 0.2 vol. %; cooling to 200° C.; introducing high-purity hydrogen until the hydrogen concentration reached more than 95 vol. %; heating to 480° C. and keeping for 4 hours; cooling to 400° C.; injecting 0.12 g dimethyl disulfide (DMDS) into hydrogen to perform presulfurization; introducing refined naphtha as shown in Table 2 in a feeding volume of 110 g/h (WHSV 2.2 h$^{-1}$) to the reactor; heating to 500° C. to react for 200 hours; the yields and octane numbers of the liquid products before and after the catalyst regeneration as measured are shown in Table 3.

Comparative Example 2

Introducing naphtha to carry out the catalytic reforming reaction after presulfurizing the catalyst in a reduced state according to the method in step (1) of Comparative Example 1; heating to 500° C. to react for 200 hours; performing the catalyst regeneration according to the following method:

cooling the reactor to 400° C.; stopping feeding; heating the recycle hydrogen to 480° C.; maintaining for 2 hours to carry out the hydrogen activation; cooling to 400° C.; injecting dimethyl disulfide (DMDS) in such an amount that the sulfur content in the catalyst was 0.3%; introducing nitrogen until the replacement was qualified; heating to 350° C.; introducing air from the inlet of the compressor; gradually heating to 500° C. to conduct coke-burning; controlling the oxygen content in the recycle gas to 0.8 vol. %; coke-burning in a gas circulation volume of 100 L/h; gradually improving the oxygen content in the recycle gas during said process and maintaining the oxygen content larger than 5%, wherein the oxygen contents at the outlet/inlet of the reactor being identical showed that the coke-burning was complete; continuing to introducing air until the oxygen content was 10%; injecting dichloroethane to conduct chlorination oxidation, wherein the chlorine injection quantity made the chlorine content in the catalyst 1.0%; heating to 520° C. after the end of the chlorination oxidation; maintaining the oxygen content at 10%; cycling for 6 hours; cooling to 100° C.; after introducing high-purity nitrogen to the recycle gas until the oxygen content was less than 0.2 vol. %, introducing high-purity hydrogen until the hydrogen concentration reached more than 95 vol. %; heating to 400° C.; introducing the refined naphtha as shown in Table 2 in a feeding volume of 110 g/h (WHSV 2.2 h$^{-1}$); heating to 500° C. to react for 200 hours; the yields and octane numbers of the liquid products before and after the catalyst regeneration as measured are shown in Table 3.

Comparative Example 3

Introducing naphtha to carry out the catalytic reforming reaction after presulfurizing the catalyst in a reduced state according to the method in step (1) of Comparative Example 1; heating to 500° C. to react for 200 hours; performing the catalyst regeneration according to the following method:

cooling the reactor to 400° C.; stopping feeding; heating the recycle hydrogen to 480° C.; maintaining for 2 hours to carry out the hydrogen activation; cooling; introducing nitrogen until the replacement was qualified; heating to 350° C.; introducing air from the inlet of the compressor; gradually heating to 500° C. to conduct coke-burning; controlling the oxygen content in the recycle gas to 0.8 vol. %; coke-burning in a gas circulation volume of 100 L/h; gradually improving the oxygen content in the recycle gas during said process and maintaining the oxygen content more than 5%, wherein the oxygen contents at the outlet/inlet of the reactor being identical showed that the catalyst coke-burning was complete; then cooling; introducing nitrogen to replace the air by one-through means, wherein it was qualified when the oxygen content was less than 0.5%; then introducing hydrogen; heating to 400° C.; injecting DMDS in such an amount that the sulfur content in the catalyst was 0.3%; then cooling, introducing nitrogen to carry out replacement; after the nitrogen replacement was qualified, heating to 300° C.; introducing air, so that the oxygen content was 10%; heating to 500° C.; maintaining the gas cycle; injecting dichloroethane to conduct chlorination oxidation, wherein the chlorine injection quantity made the chlorine content in the catalyst 1.0%; heating to 520° C. after the end of the chlorination oxidation; maintaining the oxygen content at 10%; cycling for 6 hours; cooling to 100° C.; after introducing high-purity nitrogen to the recycle gas until the oxygen content was less than 0.2 vol. %, cooling to 200° C.; introducing high-purity hydrogen until the hydrogen concentration reached more than 95 vol. %; heating to 400° C.; introducing the refined naphtha as shown in Table 2 in a feeding volume of 110 g/h (WHSV 2.2 h$^{-1}$); heating to 500° C. to react for 200 hours; the yields and octane numbers of the liquid products before and after the catalyst regeneration as measured are shown in Table 3.

Example 1

Introducing naphtha to carry out the catalytic reforming reaction after presulfurizing the catalyst in a reduced state according to the method in step (1) of Comparative Example 1; heating to 500° C. to react for 200 hours; performing the catalyst regeneration according to the following method:

cooling the reactor to 400° C.; stopping introducing refined naphtha thereinto, but introducing crude naphtha that is not hydrotreated and having a constitution as shown in Table 2; maintaining the feeding of crude naphtha for 4 hours until the sulfur content of the crude naphtha introduced took up 0.34% of the mass of the catalyst; stopping introducing the crude naphtha; blowing with nitrogen until the total amount of $H_2$ and hydrocarbon in the recycle gas was less than 0.3 vol %; heating to 500° C.; introducing air from the inlet of the compressor; controlling the oxygen content in the recycle gas to 0.8 vol. %; coke-burning for 20 hours in a gas circulation volume of 100 L/h, wherein the oxygen contents at the outlet/inlet of the reactor being identical showed that the coke-burning was complete; continuing to introduce air, so that the oxygen content in the recycle gas reached 10.5 vol. %; maintaining the gas cycle; injecting 0.50 ml dichloroethane in five batches within 4 hours to carry out the oxychlorination; introducing high-purity nitrogen until the oxygen content in the recycle gas was less than 0.2 vol. %; cooling to 200° C.; introducing high-purity hydrogen until the hydrogen concentration reached more than 95 vol. %; heating to 480° C. and reducing for 4 hours; cooling to 400° C.; introducing refined naphtha as shown in Table 2 in a feeding volume of 110 g/h (WHSV 2.2 $h^{-1}$); heating to 500° C. to react for 200 hours; the yields and octane numbers of the liquid products before and after the catalyst regeneration as measured are shown in Table 3.

Example 2

Introducing naphtha to carry out the catalytic reforming reaction after presulfurizing the catalyst in a reduced state according to the method in step (1) of Comparative Example 1; heating to 500° C. to react for 200 hours; performing the catalyst regeneration according to the following method:

cooling the reactor to 400° C.; adding DMDS to the refined naphtha introduced into the reactor, so that it comprises 900 ppm sulfur; maintaining the feeding for 2 hours until the amount of sulfur introduced into the refined naphtha took up 0.40% of the mass of the catalyst; stopping feeding; blowing with nitrogen until the total amount of $H_2$ and hydrocarbon in the recycle gas was less than 0.3 vol %; heating to 500° C.; introducing air from the inlet of the compressor; controlling the oxygen content in the recycle gas to 0.8 vol. %; coke-burning for 20 hours in a gas circulation volume of 100 L/h, wherein the oxygen contents at the outlet/inlet of the reactor being identical showed that the coke-burning was complete; continuing to introduce air, so that the oxygen content in the recycle gas reached 10.5 vol. %; maintaining the gas cycle; injecting 0.52 ml dichloroethane in five batches within 4 hours to carry out the oxychlorination; introducing high-purity nitrogen until the oxygen content in the recycle gas was less than 0.2 vol. %; cooling to 200° C.; introducing high-purity hydrogen until the hydrogen concentration reached 95 vol. %; heating to 480° C. and reducing for 4 hours; cooling to 400° C.; introducing refined naphtha having a constitution as shown in Table 2 in a feeding volume of 110 g/h (WHSV 2.2 $h^{-1}$); heating to 500° C. to react for 200 hours; the yields and octane numbers of the liquid products before and after the catalyst regeneration as measured are shown in Table 3.

Example 3

Introducing naphtha to carry out the catalytic reforming reaction after presulfurizing the catalyst in a reduced state according to the method in step (1) of Comparative Example 1; heating to 500° C. to react for 200 hours; performing the catalyst regeneration according to the following method:

cooling the reactor to 400° C.; adding methyl mercaptan ($CH_3SH$) to the refined naphtha introduced into the reactor, so that it comprises 500 ppm sulfur; maintaining the feeding for 4 hours until the amount of sulfur in the refined naphtha introduced took up 0.44% of the mass of the catalyst; stopping feeding; blowing with nitrogen until the total amount of $H_2$ and hydrocarbon in the recycle gas was less than 0.3 vol %; heating to 500° C.; introducing air from the inlet of the compressor; controlling the oxygen content in the recycle gas to 0.8 vol. %; coke-burning for 20 hours in a gas circulation volume of 100 L/h, wherein the oxygen contents at the outlet/inlet of the reactor being identical showed that the coke-burning was complete; continuing to introduce air, so that the oxygen content in the recycle gas reached 10.5 vol. %; maintaining the gas cycle; injecting 0.50 ml dichloroethane in five batches within 4 hours to carry out the oxychlorination; introducing high-purity nitrogen until the oxygen content in the recycle gas was less than 0.2 vol. %; cooling to 200° C.; introducing high-purity hydrogen until the hydrogen concentration reached 95 vol. %; heating to 480° C. and reducing for 4 hours; cooling to 400° C.; introducing refined naphtha having a constitution as shown in Table 2 in a feeding volume of 110 g/h (WHSV 2.2 $h^{-1}$); heating to 500° C. to react for 200 hours; the yields and octane numbers of the liquid products before and after the catalyst regeneration as measured are shown in Table 3.

Example 4

Introducing naphtha to carry out the catalytic reforming reaction after presulfurizing the catalyst in a reduced state according to the method in step (1) of Comparative Example 1; heating to 500° C. to react for 200 hours; performing the catalyst regeneration according to the following method:

cooling the reactor to 400° C.; stopping feeding; introducing hydrogen having a sulfur content of 160 µg/L in a flow rate of 100 L/h at the inlet of the compressor; lasting for 10 hours until the amount of the sulfur-containing hydrogen introduced was 1000 L, and the total sulfur amount in the sulfur-containing hydrogen was 0.32% of the mass of the catalyst; stopping introducing sulfur-containing hydrogen; blowing with nitrogen until the total amount of $H_2$ and hydrocarbon in the recycle gas was less than 0.3 vol %; heating to 500° C.; introducing air from the inlet of the compressor; controlling the oxygen content in the recycle gas to 0.8 vol. %; coke-burning for 20 hours in a gas circulation volume of 100 L/h, wherein the oxygen contents at the outlet/inlet of the reactor being identical showed that the coke-burning was complete; continuing to introduce air, so that the oxygen content in the recycle gas reached 10.5 vol. %; maintaining the gas cycle; injecting 0.50 ml dichloroethane in five batches within 4 hours to carry out the oxychlorination; introducing high-purity nitrogen until the oxygen content in the recycle gas was less than 0.2 vol. %; cooling to 200° C.; introducing high-purity hydrogen until the hydrogen concentration reached 95 vol. %; heating to 480° C. and reducing for 4 hours; cooling to 400° C.; introducing refined naphtha having a constitution as shown in Table 2 in a feeding volume of 110 g/h (WHSV 2.2 $h^{-1}$); heating to 500° C. to react for 200 hours; the yields and octane numbers of the liquid products before and after the catalyst regeneration as measured are shown in Table 3.

From Table 3, it can be seen that the regeneration method of the present invention, compared to the conventional regeneration method in Comparative Example 1, achieved improved yields and octane numbers of the liquid product after the catalyst regeneration.

TABLE 1

| catalyst name | contents of active components of the catalyst, mass % | | |
|---|---|---|---|
| | Pt | Re | Cl |
| PRT-D | 0.21 | 0.46 | 1.12 |

* Contents of active components of the catalyst were calculated based on the alumina support.

TABLE 2

| feedstock | alkane, mass % | cycloalkane, mass % | arene, mass % | sulfur content, ppm |
|---|---|---|---|---|
| refined naphtha | 47.78 | 40.24 | 11.98 | 0.2 |
| crude naphtha | 47.78 | 40.24 | 11.98 | 383 |

TABLE 3

| example number | liquid product RON octane number | | liquid product yield, mass % | |
|---|---|---|---|---|
| | before regeneration (fresh catalyst) | after regeneration | before regeneration (fresh catalyst) | after regeneration |
| Comparative Example 1 | 98.8 | 98.5 | 88.3 | 88.1 |
| Comparative Example 2 | 98.8 | 97.5 | 88.3 | 86.8 |
| Comparative Example 3 | 98.8 | 97.6 | 88.3 | 87.0 |
| 1 | 98.8 | 99.0 | 88.3 | 88.5 |
| 2 | 98.8 | 99.1 | 88.4 | 88.5 |
| 3 | 98.8 | 99.0 | 88.3 | 88.6 |
| 4 | 98.8 | 98.9 | 88.3 | 88.5 |

In the third method for regenerating platinum-rhenium reforming catalyst of the present invention:

Comparative Example 1a

Taking 50 g (60 mL) PRT-D catalyst after coking deactivation (produced from Changling Branch of SINOPEC Catalyst Co., Ltd); coke-burning with nitrogen having an oxygen content of 0.8 vol. % for 20 hours to obtain a coke-burned off catalyst having a constitution as shown in Table 1a; charging the coke-burned off catalyst into a 100 mL stainless steel pipe reactor; introducing dry air to pressurize to 1.0 MPa; maintaining gas cycle in a circulation volume of 100 L/h; heating to 500° C.; injecting 0.5 ml dichloroethane in five batches within 4 hours to carry out the oxychlorination; introducing high-purity nitrogen until the oxygen content in the recycle gas was less than 0.2 vol. %; cooling to 200° C.; introducing high-purity hydrogen until the hydrogen concentration reached 95 vol. %; heating to 480° C. in a circulation volume of 150 L/h and reducing for 4 hours; cooling to 400° C.; injecting 0.12 g DMDS to perform presulfurization to obtain the regeneration catalyst, the sulfur content of which is 0.10% by mass;

introducing refined naphtha as shown in Table 2 in a feeding volume of 110 g/h (WHSV 2.2 h$^{-1}$) to the reactor charged with regeneration catalyst; heating to 500° C. to react for 200 hours; the yields and octane numbers of the liquid products before and after the catalyst regeneration as measured are shown in Table 3a.

Example 1a

Taking 50 g PRT-D catalyst after being coke-burned according to the method in Comparative Example 1a; pouring it into a 250 mL flask; vacuumizing to 0.03 MPa (absolute pressure); taking 0.8 g sulfuric acid with a concentration of 98 mass %, 1.0 g hydrochloric acid with a concentration of 36 mass % to formulate a solution with a volume of 70 mL, which was an impregnation solution, wherein the sulfur content was 0.51% of the mass of the catalyst, the chlorosity was 0.7% of the mass of the catalyst; adding the impregnation solution to a flask filled with the coke-burned off catalyst; rotating said flask at a velocity of 8 rpm; heating to 80° C.; impregnating for 5 hours; drying the catalyst in air of 110° C. for 4 hours after the impregnation; calcinating for 4 hours at 500° C.;

cooling the above impregnated and calcinated catalyst to 40° C.; charging it into a 100 mL stainless steel pipe reactor; introducing high-purity nitrogen for substitution until the oxygen content in the recycle gas was less than 0.2 vol. %; then introducing hydrogen for substitution until the hydrogen concentration was more than 95 vol. %; pressurizing to 1.0 MPa; maintaining the gas cycle in a circulation volume of 150 L/h; heating to 480° C. and reducing for 4 hours to obtain the regeneration catalyst;

cooling to 400° C.; introducing refined naphtha as shown in Table 2 into a reactor charged with regeneration catalyst in a feeding volume of 110 g/h (WHSV 2.2 h$^{-1}$); heating to 500° C. to react for 200 hours; the yields and octane numbers of the liquid products before and after the catalyst regeneration as measured are shown in Table 3a.

Example 2a

Taking 50 g PRT-D catalyst after being coke-burned according to the method in Comparative Example 1a; pouring it into a 250 mL flask; vacuumizing to 0.02 MPa (absolute pressure); taking 1.1 g ammonium sulfate with a purity of 99.9 mass %, 1.0 g hydrochloric acid with a concentration of 36 mass % to formulate a solution with a volume of 75 mL, which was an impregnation solution, wherein the sulfur content was 0.53% of the mass of the catalyst, the chlorosity was 0.7% of the mass of the catalyst; adding the impregnation solution to a flask filled with the coke-burned off catalyst; rotating said flask at a velocity of 8 rpm; heating to 85° C.; impregnating for 4 hours; drying the catalyst in air of 110° C. for 3 hours after the impregnation; calcinating for 4 hours at 500° C.;

cooling the above impregnated and calcinated catalyst to 40° C.; charging it into a 100 mL stainless steel pipe reactor; introducing high-purity nitrogen for substitution until the oxygen content in the recycle gas was less than 0.2 vol. %; then introducing hydrogen for substitution until the hydrogen concentration was more than 95 vol. %; pressurizing to 1.0 MPa; maintaining the gas cycle in a circulation volume of 150 L/h; heating to 480° C. and reducing for 4 hours to obtain the regeneration catalyst;

cooling to 400° C.; introducing refined naphtha as shown in Table 2 into a reactor charged with regeneration catalyst in a feeding volume of 110 g/h (WHSV 2.2 h$^{-1}$); heating to 500° C. to react for 200 hours; the yields and octane numbers of the liquid products before and after the catalyst regeneration as measured are shown in Table 3a.

Example 3a

Taking 50 g PRT-D catalyst after being coke-burned according to the method in Comparative Example 1a; pouring it into a 250 mL flask; vacuumizing to 0.02 MPa (absolute pressure); taking 0.8 g sulfuric acid with a concentration of 98 mass %, 0.6 g hydrochloric acid with a concentration of 36 mass % and 0.2 g trichloroacetic acid with a purity of 99 mass % to formulate a solution with a volume of 70 mL, which was an impregnation solution, wherein the sulfur content was 0.51% of the mass of the catalyst, the chlorosity was 0.65% of the mass of the catalyst; adding the impregnation solution to a flask filled with the coke-burned off catalyst; rotating said flask at a velocity of 8 rpm; heating to 85° C.; impregnating for 4 hours; drying the catalyst in air of 110° C. for 3 hours after the impregnation; calcinating for 4 hours at 500° C.;

cooling the above impregnated and calcinated catalyst to 40° C.; charging it into a 100 mL stainless steel pipe reactor; introducing high-purity nitrogen for substitution until the oxygen content in the recycle gas was less than 0.2 vol. %; then introducing hydrogen for substitution until the hydrogen concentration was more than 95 vol. %; pressurizing to 1.0 MPa; maintaining the gas cycle in a circulation volume of 150 L/h; heating to 480° C. and reducing for 4 hours to obtain the regeneration catalyst;

cooling to 400° C.; introducing refined naphtha as shown in Table 2 into a reactor charged with regeneration catalyst in a feeding volume of 110 g/h (WHSV 2.2 $h^{-1}$); heating to 500° C. to react for 200 hours; the yields and octane numbers of the liquid products before and after the catalyst regeneration as measured are shown in Table 3a.

It can be seen from Table 3a that the regeneration method of the present invention, compared to Comparative Example 1a, achieved improved yields and octane numbers of the liquid product after the catalyst regeneration.

TABLE 1a

| catalyst name | Pt, mass % | Re, mass % | Cl, mass % | C, mass % | S, mass % |
|---|---|---|---|---|---|
| PRT-D | 0.21 | 0.46 | 0.71 | 0.1 | 0.02 |

TABLE 3a

| | liquid product RON octane number | | liquid product yield, mass % | |
|---|---|---|---|---|
| example number | before regeneration (fresh catalyst) | after regeneration | before regeneration (fresh catalyst) | after regeneration |
| Comparative Example 1a | 98.8 | 98.5 | 88.5 | 88.3 |
| 1a | 98.8 | 99.0 | 88.5 | 88.7 |
| 2a | 98.8 | 99.0 | 88.5 | 88.7 |
| 3a | 98.8 | 98.9 | 85.5 | 88.8 |

In the second method for regenerating semi-regenerated reforming catalyst of the present invention:

Example 1b

Taking 50 g PRT-D catalyst after being coke-burned according to the method in Comparative Example 1a; pouring it into a 250 mL flask; vacuumizing to 0.03 MPa (absolute pressure); adding 70 ml dilute sulphuric acid solution at a concentration of 0.007 g/mL, wherein the sulfur content in the solution was 0.32% of the mass of the catalyst; rotating said flask at a velocity of 8 rpm; heating to 80° C.; impregnating for 5 hours; drying the impregnated catalyst in air for 4 hours at 110° C.; calcinating for 4 hours at 500° C.;

charging the above catalyst impregnated, into which sulfate ions were introduced, into a 100 mL stainless steel pipe reactor; introducing dry air to pressurize to 1.0 MPa; maintaining the gas cycle in a circulation volume of 100 L/h; heating to 500° C.; injecting 0.5 ml dichloroethane in five batches within 4 hours to carry out the oxychlorination; introducing high-purity nitrogen until the oxygen content in the recycle gas was less than 0.2 vol. %; cooling to 200° C.; introducing high-purity hydrogen until the hydrogen concentration reached 95 vol. %; heating to 480° C. in a circulation volume of 150 L/h and reducing for 4 hours to obtain the regeneration catalyst;

cooling to 400° C.; introducing refined naphtha having a constitution as shown in Table 2 into a reactor charged with regeneration catalyst in a feeding volume of 110 g/h (WHSV 2.2 $h^{-1}$); heating to 500° C. to react for 200 hours; the yields and octane numbers of the liquid products before and after the catalyst regeneration as measured are shown in Table 3b.

Example 2b

Taking 50 g PRT-D catalyst after being coke-burned according to the method in Comparative Example 1a; pouring it into a 250 mL flask; vacuumizing to 0.02 MPa (absolute pressure); adding 75 ml ammonium sulfate solution at a concentration of 0.012 g/mL, wherein the sulfur content in the solution was 0.43% of the mass of the catalyst; heating to 85° C.; impregnating for 4 hours; drying the impregnated catalyst in air for 3 hours at 110° C.; calcinating for 4 hours at 500° C.;

charging the above catalyst impregnated, into which sulfate ions were introduced, into a 100 mL stainless steel pipe reactor; introducing dry air to pressurize to 1.0 MPa; maintaining the gas cycle in a circulation volume of 100 L/h; heating to 500° C.; injecting 0.5 ml dichloroethane in five batches within 4 hours to carry out the oxychlorination; introducing high-purity nitrogen until the oxygen content in the recycle gas was less than 0.2 vol. %; cooling to 200° C.; introducing high-purity hydrogen until the hydrogen concentration reached 95 vol. %; heating to 480° C. in a circulation volume of 150 L/h and reducing for 4 hours to obtain the regeneration catalyst;

cooling to 400° C.; introducing refined naphtha having a constitution as shown in Table 2 into a reactor charged with regeneration catalyst in a feeding volume of 110 g/h (WHSV 2.2 $h^{-1}$); heating to 500° C. to react for 200 hours; the yields and octane numbers of the liquid products before and after the catalyst regeneration as measured are shown in Table 3b.

It can be seen from Table 3b that the regeneration method of the present invention, compared to Comparative Example 1a, achieved improved yields and octane numbers of the liquid product after the catalyst regeneration.

TABLE 3b

| example number | liquid product RON octane number | | liquid product yield, mass % | |
|---|---|---|---|---|
| | before regeneration (fresh catalyst) | after regeneration | before regeneration (fresh catalyst) | after regeneration |
| Comparative Example 1a | 98.8 | 98.5 | 88.5 | 88.3 |
| 1b | 98.8 | 99.0 | 88.5 | 88.7 |
| 2b | 98.8 | 98.9 | 88.5 | 88.7 |

The invention claimed is:

1. A method for regenerating semi-regenerated reforming catalyst, comprising adjusting a reaction temperature to 250-480° C.;
   introducing a sulfur-containing naphtha into a reforming reactor so that the sulfur content in the catalyst is 0.32-0.8 mass %, then stopping introducing the sulfur-containing naphtha into the reforming reactor; or
   stopping introducing a feedstock into the reforming reactor, and introducing a sulfur-containing hydrogen into a recycle gas, so that the sulfur content in the catalyst is 0.32-0.8 mass %, then stopping the recycle gas; and
   subjecting the catalyst to coke-burning, oxychlorination and reduction.

2. The method according to claim 1, characterized in that the sulfur content in the catalyst before coke-burning is 0.32-0.6 mass %.

3. The method according to claim 1, characterized in that said sulfur-containing naphtha is sulfur-containing crude naphtha or refined naphtha comprising sulfur-containing compounds.

4. The method according to claim 1, characterized in that the sulfur content of said sulfur-containing naphtha is 100-10000 ppm, and the sulfur content of the sulfur-containing hydrogen introduced into the recycle gas is 10-1000 μg/L.

5. The method according to claim 1, characterized in that the sulfur content of said sulfur-containing naphtha is 200-2000 ppm.

6. The method according to claim 3, characterized in that said sulfur-containing compounds are selected from the group consisting of hydrogen sulfide, thioether, disulphide, thioaldehyde, thiophene and their derivatives.

7. The method according to claim 1, characterized in that the sulfur-containing naphtha is introduced into the reactor at a weight hourly space velocity of 0.1-10.0 h$^{-1}$ for a time of 1-100 hours.

8. The method according to claim 1, characterized in that the reaction temperature is adjusted to 350-450° C. before introducing the sulfur-containing naphtha into the reforming reactor.

9. The method according to claim 1, characterized in that a chlorine injection quantity of the oxychlorination is 0.1-1.5% of the mass of the catalyst.

10. A method for regenerating semi-regenerated reforming catalyst, comprising introducing sulfate ions thereinto by impregnation after coke-burning a spent catalyst; then performing oxychlorination and reduction.

11. The method according to claim 10, characterized in that the sulfate ions are introduced into a carbon-free catalyst obtained by coke-burning in such an amount that the spent catalyst comprises 0.32-0.8 mass % of sulfur.

12. The method according to claim 10, characterized in that the sulfate ions are introduced into a carbon-free catalyst obtained by coke-burning in such an amount that the spent catalyst comprises 0.32-0.6 mass % of sulfur.

13. The method according to claim 1, characterized in that a chlorine injection quantity of the oxychlorination is 0.1-2.0% of the mass of the catalyst.

14. The method according to claim 10, characterized in that a chlorine injection quantity of the oxychlorination is 0.1-2.0% of the mass of the catalyst.

15. The method according to claim 10, characterized in that the catalyst into which sulfate ions are introduced by impregnation is dried and calcinated in air and then subject to oxychlorination and reduction, wherein a drying temperature in the drying step is 70-200° C., and a calcination temperature in the calcinating step is 400-600° C.

16. A method for regenerating a platinum-rhenium semi-regenerated reforming catalyst, comprising coke-burning a spent catalyst; introducing sulfate ions and chlorine by impregnation; then drying, calcinating and reducing.

17. The method according to claim 16, characterized in that the amount of sulfur in the impregnation solution that introduces sulfate ions and chlorine by impregnation is 0.32-0.8% of the mass of the catalyst, and the amount of chlorine contained therein is 0.1-2.0% of the mass of the catalyst.

18. The method according to claim 16, characterized in that the amount of sulfur in the impregnation solution that introduces sulfate ions and chlorine by impregnation is 0.32-0.6% of the mass of the catalyst, and the amount of chlorine contained therein is 0.2-1.0% of the mass of the catalyst.

19. The method according to claim 10 characterized in introducing sulfate ions by impregnation or introducing sulfate ions and chlorine by impregnation into a carbon-free catalyst obtained by coke-burning, wherein a formulated impregnation solution is 0.5-2.0 times of the volume of the catalyst.

20. The method according to claim 16, characterized in introducing sulfate ions by impregnation or introducing sulfate ions and chlorine by impregnation into a carbon-free catalyst obtained by coke-burning, wherein a formulated impregnation solution is 0.5-2.0 times of the volume of the catalyst.

21. The method according to claim 10, characterized in that the sulfur in the impregnation solution that introduces sulfate ions by impregnation or the sulfur in the impregnation solution that introduces sulfate ions and chlorine by impregnation is provided from sulfuric acid, ammonium sulfate or aluminum sulfate.

22. The method according to claim 16, characterized in that the sulfur in the impregnation solution that introduces sulfate ions by impregnation or the sulfur in the impregnation solution that introduces sulfate ions and chlorine by impregnation is provided from sulfuric acid, ammonium sulfate or aluminum sulfate.

23. The method according to claim 10, characterized in that the temperature for introducing sulfate ions by impregnation or introducing sulfate ions and chlorine by impregnation is 20-99° C.

24. The method according to claim 16, characterized in that the temperature for introducing sulfate ions by impregnation or introducing sulfate ions and chlorine by impregnation is 20-99° C.

25. The method according to claim 10 characterized in that the pressure for introducing sulfate ions by impregnation or introducing sulfate ions and chlorine by impregnation is 0.001-0.08 MPa.

26. The method according to claim 16 characterized in that the pressure for introducing sulfate ions by impregnation or introducing sulfate ions and chlorine by impregnation is 0.001-0.08 MPa.

27. The method according to claim 16, characterized in that the catalyst into which sulfate ions and chlorine are introduced by impregnation is dried in air and calcinated, wherein the drying temperature is 70-200° C., and the calcination temperature is 400-600° C.

28. The method according to claim 16, characterized in that said chlorine originates from hydrochloric acid and/or chloroacetic acid.

29. The method according to claim 28, characterized in that said chloroacetic acid is trichloroacetic acid or dichloroacetic acid.

30. The method according to claim 10, characterized in that the temperature for coke-burning the spent catalyst is 400-550° C., and the oxygen content in the oxygen-containing nitrogen used for coke-burning is 0.5-21 vol. %.

31. The method according to claim 16, characterized in that the temperature for coke-burning the spent catalyst is 400-550° C., and the oxygen content in the oxygen-containing nitrogen used for coke-burning is 0.5-21 vol. %.

32. The method according to claim 1, characterized in that the reduction method is to introduce hydrogen at a temperature of not higher than 250° C. and gradually heat to 420-520° C. to reduce the catalyst.

33. The method according to claim 10, characterized in that the reduction method is to introduce hydrogen at a temperature of not higher than 250° C. and gradually heat to 420-520° C. to reduce the catalyst.

34. The method according to claim 16, characterized in that the reduction method is to introduce hydrogen at a temperature of not higher than 250° C. and gradually heat to 420-520° C. to reduce the catalyst.

35. The method according to claim 1, characterized in that said semi-regenerated reforming catalyst comprises alumina support and active components having the following contents based on the alumina support: platinum 0.1-2.0 mass %; rhenium 0.1-2.0 mass %; and chlorine 0.5-5.0 mass %.

36. The method according to claim 10, characterized in that said semi-regenerated reforming catalyst comprises alumina support and active components having the following contents based on the alumina support: platinum 0.1-2.0 mass %; rhenium 0.1-2.0 mass %; and chlorine 0.5-5.0 mass %.

37. The method according to claim 16, characterized in that said semi-regenerated reforming catalyst comprises alumina support and active components having the following contents based on the alumina support: platinum 0.1-2.0 mass %; rhenium 0.1-2.0 mass %; and chlorine 0.5-5.0 mass %.

38. The method according to claim 35, characterized in that said reforming catalyst also comprises 0.1-10 mass % of yttrium or rare earth metal.

39. The method according to claim 36, characterized in that said reforming catalyst also comprises 0.1-10 mass % of yttrium or rare earth metal.

40. The method according to claim 37, characterized in that said reforming catalyst also comprises 0.1-10 mass % of yttrium or rare earth metal.

* * * * *